(12) United States Patent
Welter

(10) Patent No.: US 8,962,719 B2
(45) Date of Patent: Feb. 24, 2015

(54) RUBBER COMPOSITION WITH ENCAPSULATED RESIN AND PNEUMATIC TIRE

(71) Applicant: The Goodyear Tire & Rubber Company, Akron, OH (US)

(72) Inventor: Carolin Anna Welter, Schleich (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/027,395

(22) Filed: Sep. 16, 2013

(65) Prior Publication Data

US 2014/0121308 A1   May 1, 2014

Related U.S. Application Data

(60) Provisional application No. 61/721,101, filed on Nov. 1, 2012.

(51) Int. Cl.
| | |
|---|---|
| *C08K 5/34* | (2006.01) |
| *C08K 5/00* | (2006.01) |
| *C08L 9/00* | (2006.01) |
| *B60C 1/00* | (2006.01) |
| *C08L 21/00* | (2006.01) |
| *C08L 61/06* | (2006.01) |
| *C08L 61/28* | (2006.01) |

(52) U.S. Cl.
CPC ... *C08L 9/00* (2013.01); *B60C 1/00* (2013.01); *C08L 21/00* (2013.01); *C08L 61/06* (2013.01); *C08L 61/28* (2013.01)
USPC .......................................... 524/100; 524/81

(58) Field of Classification Search
CPC ........................................................ C08L 9/00
USPC ........................................................ 524/100
See application file for complete search history.

(56) References Cited

U.S. PATENT DOCUMENTS

| | | | |
|---|---|---|---|
| 4,102,800 A | 7/1978 | Popoff et al. | |
| 4,895,884 A | 1/1990 | Benko et al. | |
| 6,998,088 B2 | 2/2006 | Beers et al. | |
| 7,441,574 B2 | 10/2008 | Koster et al. | |
| 7,528,181 B2 | 5/2009 | Bailey et al. | |
| 7,902,265 B2 | 3/2011 | Kitamura et al. | |
| 2004/0055686 A1* | 3/2004 | Cowger et al. ............. | 152/516 |
| 2008/0115874 A1* | 5/2008 | Thielen ....................... | 152/541 |
| 2008/0173382 A1 | 7/2008 | Gobinath et al. | |
| 2008/0227888 A1 | 9/2008 | Jobmann et al. | |

FOREIGN PATENT DOCUMENTS

| | | |
|---|---|---|
| EP | 1669400 A1 | 6/2006 |
| EP | 1930184 A1 | 6/2008 |
| EP | 2492307 A1 | 8/2012 |
| KR | 20040011258 A | 2/2004 |
| WO | WO2004050756 A2 | 6/2004 |

OTHER PUBLICATIONS

EPO Search Report dated Jan. 29, 2014.

\* cited by examiner

*Primary Examiner* — Hui Chin
(74) *Attorney, Agent, or Firm* — John D. DeLong

(57) ABSTRACT

The present invention is directed to a vulcanizable rubber composition comprising at least one diene based elastomer and an in-situ resin, the in-situ resin comprising a methylene acceptor and a methylene donor, wherein one of the methylene acceptor and methylene donor is microencapsulated.

16 Claims, 1 Drawing Sheet

RUBBER COMPOSITION WITH ENCAPSULATED RESIN AND PNEUMATIC TIRE

BACKGROUND OF THE INVENTION

A tire is a composite of several components each serving a specific and unique function yet all synergistically functioning to produce the desired performance. One important component is the carcass ply. The carcass ply is a continuous layer of rubber-coated parallel cords which extends from bead to bead and functions as a reinforcing element of the tire. The plies are turned up around the bead, thereby locking the bead into the assembly or carcass. The tire is assembled in the green (uncured) state and upon completion is then vulcanized. Typically an in-situ resin is included in an apex rubber composition to impart desirable properties to the rubber composition, including hardness, tear strength, and adhesion to reinforcement. Typically, methylene acceptor-methylene donor systems are used as in-situ resins.

The usage of reinforcing in-situ resins for stiff compounds is currently limited by the poor processability of the rubber compounds due to preliminary curing of the resin additives during mixing, calendering and extrusion. Such stiff compounds may be used for example in the apex, chafer, chipper, and flipper of a tire. Therefore, there exists a continuing need for alternative compounding approaches to maintain or improve the properties of rubber compounds.

BRIEF DESCRIPTION OF THE DRAWING

The invention will be described by way of example and with reference to the accompanying drawings in which.

SUMMARY OF THE INVENTION

The present invention is directed to a vulcanizable rubber composition comprising at least one diene based elastomer and an in-situ resin, the in-situ resin comprising a methylene acceptor and a methylene donor, wherein one of the methylene acceptor and methylene donor is microencapsulated.

The invention is further directed to a method of making a rubber composition, comprising the step of mixing a diene based elastomer with an in-situ resin, the in-situ resin comprising a methylene acceptor and a methylene donor, wherein one of the methylene acceptor and methylene donor is microencapsulated.

The invention is further directed to a pneumatic tire comprising a component, wherein the component comprises the vulcanizable rubber composition.

DETAILED DISCLOSURE OF THE INVENTION

There is disclosed a vulcanizable rubber composition comprising at least one diene based elastomer and an in-situ resin, the in-situ resin comprising a methylene acceptor and a methylene donor, wherein at least one of the methylene acceptor and methylene donor are microencapsulated.

There is further disclosed a method of making a rubber composition, comprising the step of mixing a diene based elastomer with an in-situ resin, the in-situ resin comprising a methylene acceptor and a methylene donor, wherein at least one of the methylene acceptor and methylene donor are microencapsulated.

There is further disclosed a pneumatic tire comprising a component, wherein the component comprises the vulcanizable rubber composition.

In one embodiment, the present invention relates to a pneumatic tire. Pneumatic tire means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load. The present invention relates to both bias and radial-ply tires. Preferably, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

Figure 1:
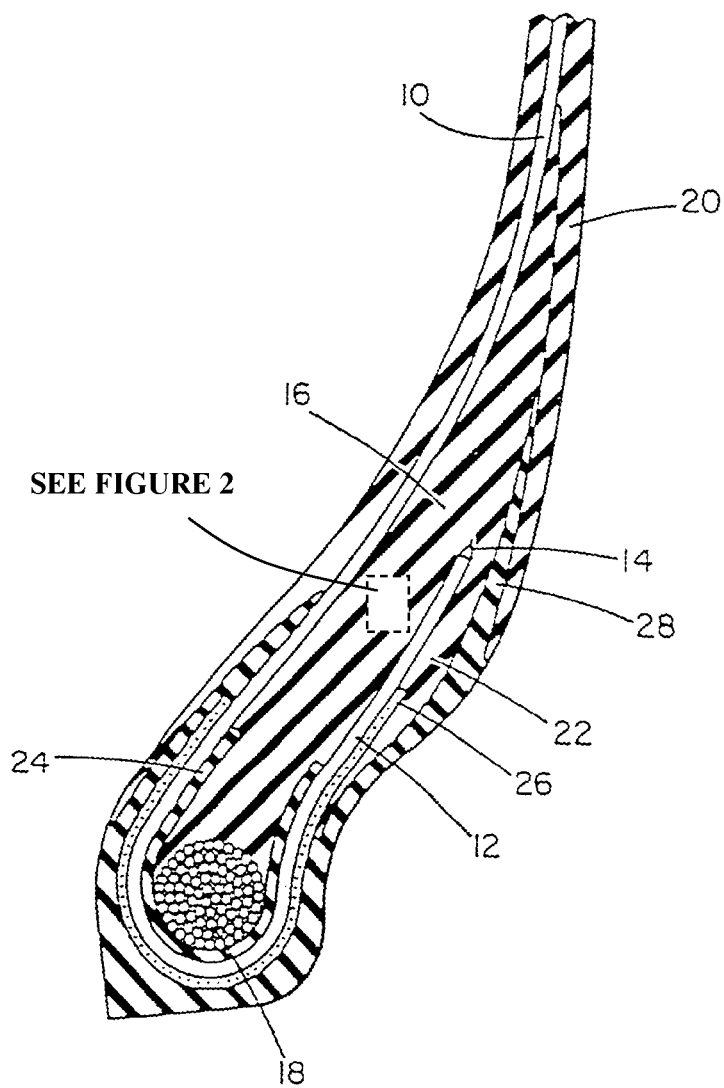
FIG. 1 is a partial cross-sectional view of a tire according to the present invention.

An embodiment of this invention is shown in FIG. 1. The pneumatic tire contains a single steel cord reinforced carcass ply 10 with a turnup portion 12 and a terminal end 14. Steel cord means one or more of the reinforcement elements, formed by one or more steel filaments/wires which may or may not be twisted or otherwise formed which may further include strands so formed which strands may or may not be also so formed, of which the carcass ply in the tire is comprised. The apex 16 is in the immediate proximity of the carcass ply turnup 14 including the area above the bead 18 and is encased by the carcass ply 10 and carcass ply turnup 12 or sidewall compound 20. The apex also includes the area 22 located between the lower sidewall 20 and the axially outer side of the carcass ply turnup 12. The interface between the bead 18 and the carcass ply 10 is a flipper 24. Located outside of the carcass ply 10 and extending in an essentially parallel relationship to the carcass ply 10 is the chipper 26. Located around the outside of the bead 18 is the chafer 28 to protect the carcass ply 12 from the rim (not shown), distribute flexing above the rim, and seal the tire.

Figure 2:
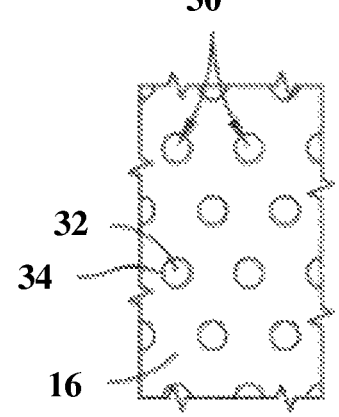
FIG. 2 shows a magnified region of FIG. 1.

In one embodiment, a rubber tire is provided having an apex 16, 22 in the region of the carcass ply turnup 12 wherein the rubber composition in the apex 16, 22 is the herein-described rubber composition. With reference now to FIG. 2, a magnified region of the apex from FIG. 1 is shown.

An encapsulated resin reactant 30, as shown in FIG. 2, is provided dispersed in apex 16 of the tire. The encapsulated resin reactant 30 includes a resin reactant 32 encapsulated by a coating material defining a microcapsule 34. The apex 16, containing the encapsulated resin reactant 30, generally can be formulated by means and methods known to those having ordinary skill in the art.

In the description of this invention, the terms "rubber" and "elastomer" when used herein, are used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer".

The Tg of an elastomer, if referred to herein, refers to a "glass transition temperature" of the elastomer which can conveniently be determined by a differential scanning calorimeter at a heating rate of 10° C. per minute.

The rubber composition includes one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The vulcanizable rubber composition also includes an in-situ resin system comprising a methylene donor and methylene acceptor, wherein at least one of the methylene donor and methylene acceptor is microencapsulated. The methylene donor and methylene acceptor are the resin reactants in an in-situ resin system where the resin reactants may react to form an in-situ resin. In one embodiment, the methylene donor is encapsulated, and the methylene acceptor is not encapsulated. In one embodiment, the methylene acceptor is encapsulated, and the methylene donor is not encapsulated. In either case, the resin reactants in the vulcanizable rubber composition that is not encapsulated is thoroughly mixed in the rubber composition, so as to ensure good contact with the other resin reactant upon release of that resin reactant from encapsulatation.

The coating material of the microcapsule can be selected from a multitude of materials or mixtures thereof. For example, the coating may include waxes such as paraffins, resins such as phenol formaldehyde or urea formaldehyde, carbon pitches, thermoplastic elastomers such as Kraton™ and thermoplastics such as syndiotactic polybutadiene, polyethylene (PE), polyethylene oxide, polyvinyl acetate, ethylene-vinyl acetate copolymers, polyvinyl alcohols (PVA), polyacrylic acid and derivatives, polycarbonates, polymethylmethacrylate (PMMA), polyorthoester, polyvinylpyrrolidone, or polypropylene (PP). In one embodiment, the coating material is polypropylene. In another embodiment, the coating material is paraffin. In yet another embodiment, the coating material is urea formaldehyde.

Since the encapsulated resin reactant is processed with rubbery polymers, as further discussed below, to ultimately provide a rubber compound, e.g., for use in an apex, the coating material selected must be able to withstand the processing temperatures. Such processing can include mixing, calendaring, and extrusion, for example. During the processing steps, the temperature experienced by the rubber composition may be high enough to promote significant reaction between the resin reactants. One or both of the resin reactants is microencapsulated to avoid such reaction during processing.

To that end, the coating material of the microcapsule is chosen so as to be thermally stable at the temperatures it encounters during processing of the rubber compound, yet selected to be thermally unstable the desired curing temperature which is greater than those processing temperatures. In particular, during cure, the rubber composition is exposed to high temperatures. Accordingly, the coating material for the microcapsule is selected to both prevent release of the resin reactant during the processing steps, such as can occur through melting or softening of the coating material, and to release the resin reactant, such as via melting or softening at the curing temperature of the rubber composition. This release can allow the resin reactant to interact with its resin reactant counterpart (ie., methylene acceptor or methylene donor). In this way, the stiffness of the rubber compound during processing is kept low to facilitate the processing, and the stiffness imparted by the in-situ resin is realized only during the cure of the rubber composition. Depending upon the type of coating material used, the point at which the coating material becomes thermally unstable may be defined by its glass transition temperature rather than its melting point. In this regard, a transition temperature of the coating material refers to its melting temperature or its glass transition temperature.

Typical mixing temperatures for the rubber composition are kept less than 130° C. to avoid premature cure, so the coating material should have a transition temperature above this level. In one embodiment, the coating material has a transition temperature greater than 130° C. In one embodiment, the coating material has a transition temperature greater than 140° C.

The coating thickness of the microcapsule also must provide enough durability for the encapsulated resin reactant to withstand the rigors of processing, such as mixing, but allow for release of the resin reactant during the cure. As such, in one example, the coating thickness is about 18 nm to about 6000 nm thick. Also, the diameter of the microcapsules can vary widely but generally may be from about 1 micron to about 2000 microns. In one embodiment, the diameter is from about 10 micron to about 150 microns.

Microencapsulation techniques are known to those having ordinary skill in the art. To that end, the encapsulated resin reactant can be prepared in a variety of ways. One feature of the processes is that microcapsules are formed completely encasing the resin reactant to provide microcapsules of the type and size described above. In one example, the microcapsule is formed of a synthetic resin material, and may be produced by well-known polymerization methods, such as interfacial polymerization, in-situ polymerization or the like. In another example, the encapsulated resin reactant may be prepared by allowing a mixture, which contains resin reactant, molten coating material, and optionally other auxiliaries such as surfactants or dispersants, to flow in a cooling column onto a rapidly rotating device such as a rotary table and migrate to the outside because of the high centrifugal force. Because the diameter is greater at the edge, the particles are separated and the formation of agglomerates avoided. After being flung off from the edge of the rotating device, the particles, or encapsulated resin reactant, fly away to the outside individually and cool in the process, as a result of which the coating solidifies.

Other processes, such as spray-drying, fluidized-bed coating, emulsion or suspension processes and precipitation also come into consideration for the preparation of the encapsulated resin reactant.

The vulcanizable rubber composition contains from 1 to 35 phr of the reaction product of a methylene acceptor and a methylene donor. Preferably, from 7 to 15 phr of the reaction product is used.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244,725; U.S. Pat. No. 5,206,289; U.S. Pat. No. 5,194,513; U.S. Pat. No. 5,030,692; U.S. Pat. No. 4,889,481; U.S. Pat. No. 4,605,696; U.S. Pat. No. 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is a reactive phenol-formaldehyde resin. Suitable reactive phenol-formaldehyde resins include SMD 30207 from Schenectedy Chemicals.

Other examples of methylene acceptors include activated phenols by ring substitution and a cashew nut oil modified novolak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor ranges from 2 to 25 phr. In another embodiment, the amount of methylene acceptor ranges from 5 to 20 phr.

In-situ resins are formed in the rubber stock and involve the reaction of a methylene acceptor and a methylene donor. The term "methylene donor" is intended to mean a compound capable of reacting with the methylene acceptor and generate the resin in-situ. Examples of methylene donors which are suitable for use in the present invention include hexamethylenetetramine, hexamethoxymethylmelamine, hexaethoxymethylmelamine, imino-methoxymethylmelamine, imino-isobutoxymethylmelamine, lauryloxymethylpyridinium chloride, ethoxymethylpyridinium chloride trioxan and hexamethoxymethylmelamine. In addition, the methylene donors may be N-substituted oxymethylmelamines, of the general formula:

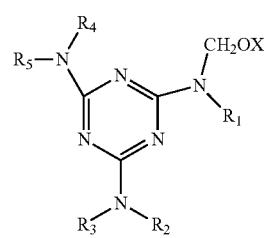

wherein X is hydrogen or an alkyl having from 1 to 8 carbon atoms, $R_1, R_2, R_3, R_4$ and $R_5$ are individually selected from the group consisting of hydrogen, an alkyl having from 1 to 8 carbon atoms, the group —CH2OX or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods.

The amount of methylene donor that is present in the rubber stock may vary. Typically, the amount of methylene donor that is present will range from about 0.1 phr to 10 phr. Preferably, the amount of methylene donor ranges from about 0.2 phr to 4 phr.

The weight ratio of the methylene acceptor to methylene donor may vary. Generally speaking, the weight ratio ranges from about 0.5:1 to 25:1. Preferably, the range is from 2:1 to 20:1.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene copolymers, also known as ethylene/propylene/diene monomer (EPDM), and in particular, ethylene/propylene/dicyclopentadiene copolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a copolymer rubber, as E-SBAR, in amounts, for example, of about 2 to about 30 weight percent bound acrylonitrile in the copolymer.

Emulsion polymerization prepared styrene/butadiene/ acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related*

Products and British Standard 2000 Parts, 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

Commonly employed carbon blacks can be used as a filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g. Carbon black may be used in an amount ranging from 10 to 150 phr.

In one embodiment the rubber composition may contain a conventional sulfur containing organosilicon compound. Examples of suitable sulfur containing organosilicon compounds are of the formula:

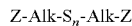

in which Z is selected from the group consisting of

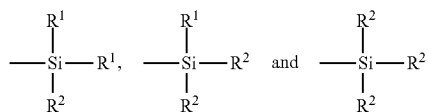

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula I, Z may be

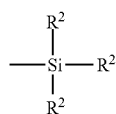

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be an apex, chafer, flipper or chipper.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

While certain representative embodiments and details have been shown for the purpose of illustrating the subject invention, it will be apparent to those skilled in this art that various changes and modifications can be made therein without departing from the scope of the subject invention.

What is claimed is:

1. A vulcanizable rubber composition comprising at least one diene based elastomer and an in-situ resin, the in-situ resin comprising a methylene acceptor and a methylene donor, wherein one of the methylene acceptor and methylene donor is microencapsulated in a material having a transition temperature sufficient to allow release of the one of the methylene donor and methylene acceptor from microencapsulation during cure of the rubber composition; wherein the microcapsule comprises a material selected from the group consisting of paraffin waxes, phenol formaldehyde resins, carbon pitches, thermoplastic elastomers, syndiotactic polybutadiene, polyethylene, polyethylene oxide, polyvinyl acetate, ethylene-vinyl acetate copolymers, polyvinyl alcohols, polyacrylic acid and derivatives, polycarbonates, polymethylmethacrylate, polyorthoester, polyvinylpyrrolidone, and polypropylene.

2. The vulcanizable rubber composition of claim 1, wherein the methylene donor is microencapsulated.

3. The vulcanizable rubber composition of claim 1, wherein the methylene acceptor is microencapsulated.

4. The vulcanizable rubber composition of claim 1, wherein the methylene donor is selected from the group consisting of hexamethylenetetramine, hexamethoxymethylmelamine, hexaethoxymethylmelamine, imino-methoxymethylmelamine, imino-isobutoxymethylmelamine, lauryloxymethylpyridinium chloride, ethoxymethylpyridinium chloride trioxan and hexamethoxymethylmelamine, N-substituted oxymethylmelamines, of the general formula:

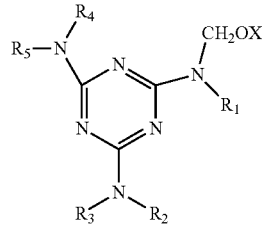

wherein X is hydrogen or an alkyl having from 1 to 8 carbon atoms, $R_1, R_2, R_3, R_4$ and $R_5$ are individually selected from the group consisting of hydrogen, an alkyl having from 1 to 8 carbon atoms, the group —$CH_2OX$ or their condensation products.

5. The vulcanizable rubber composition of claim 1, wherein the methylene acceptor is selected from the group consisting of resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, and resorcinol novolak resins.

6. A pneumatic tire fabricated from the vulcanizable rubber composition of claim 1.

7. A method of making a rubber composition, comprising the step of mixing a diene based elastomer with an in-situ resin, the in-situ resin comprising a methylene acceptor and a methylene donor, wherein one of the methylene acceptor and methylene donor is microencapsulated; and curing the rubber composition, wherein the one of the microencapsulated methylene acceptor and methylene donor is released from the microencapsulation during the curing; wherein the microcapsule comprises a material selected from the group consisting of paraffin waxes, phenol formaldehyde resins, carbon pitches, thermoplastic elastomers, syndiotactic polybutadiene, polyethylene, polyethylene oxide, polyvinyl acetate, ethylene-vinyl acetate copolymers, polyvinyl alcohols, polyacrylic acid and derivatives, polycarbonates, polymethylmethacrylate, polyorthoester, polyvinylpyrrolidone, and polypropylene.

8. The method of claim 7, wherein the methylene donor is microencapsulated.

9. The method of claim 7, wherein the methylene acceptor is microencapsulated.

10. The method of claim 7, wherein the methylene donor is selected from the group consisting of hexamethylenetetramine, hexamethoxymethylmelamine, hexaethoxymethylmelamine, imino-methoxymethylmelamine, imino-isobutoxymethylmelamine, lauryloxymethylpyridinium chloride, ethoxymethylpyridinium chloride trioxan and hexamethoxymethylmelamine, N-substituted oxymethylmelamines, of the general formula:

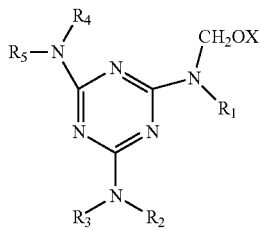

wherein X is hydrogen or an alkyl having from 1 to 8 carbon atoms, $R_1$, $R_2$ $R_3$, $R_4$ and $R_5$ are individually selected from the group consisting of hydrogen, an alkyl having from 1 to 8 carbon atoms, the group —$CH_2OX$ or their condensation products.

11. The method of claim 7, wherein the methylene acceptor is selected from the group consisting of resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, and resorcinol novolak resins.

12. A pneumatic tire made using the method of claim 7.

13. The method of claim 7, wherein the microcapsule comprises a material having a transition temperature greater than 130° C.

14. The method of claim 7, wherein the microcapsule comprises a material having a transition temperature greater than 140° C.

15. The vulcanization rubber composition of claim 1, wherein the transition temperature is greater than 130° C.

16. The vulcanization rubber composition of claim 1, wherein the transition temperature is greater than 140° C.

* * * * *